(12) United States Patent
Nanzer et al.

(10) Patent No.: US 11,341,388 B2
(45) Date of Patent: May 24, 2022

(54) WIRELESS MONITORING SYSTEM

(71) Applicants: Board of Trustees of Michigan State University, East Lansing, MI (US); The Procter & Gamble Company, Cincinnati, OH (US)

(72) Inventors: Jeffrey Nanzer, Okemos, MI (US); Stephan Gary Bush, Liberty Township, OH (US); Faiz Feisal Sherman, Mason, OH (US)

(73) Assignees: Board of Trustees of Michigan State University, East Lansing, MI (US); The Procter & Gamble Company, Cincinnati, OH (US)

( * ) Notice: Subject to any disclaimer, the term of this patent is extended or adjusted under 35 U.S.C. 154(b) by 217 days.

(21) Appl. No.: 16/807,215

(22) Filed: Mar. 3, 2020

(65) Prior Publication Data
US 2020/0284898 A1    Sep. 10, 2020

Related U.S. Application Data (60) Provisional application No. 62/903,005, filed on Sep. 20, 2019, provisional application No. 62/814,067, filed on Mar. 5, 2019.

(51) Int. Cl.
*G06K 19/07* (2006.01)
*G06K 9/62* (2022.01)
(Continued)

(52) U.S. Cl.
CPC ........ *G06K 19/0723* (2013.01); *G01S 13/583* (2013.01); *G01S 13/751* (2013.01);
(Continued)

(58) Field of Classification Search
CPC .... G01S 13/765; G01S 13/767; G01S 13/825; G01S 13/583; G01S 13/751;
(Continued)

(56) References Cited

U.S. PATENT DOCUMENTS 3,631,484 A * 12/1971 Augenblick .......... G01S 13/753
342/46
3,967,161 A    6/1976 Lichtblau
(Continued)

FOREIGN PATENT DOCUMENTS

AU    2005304829 B2    7/2009
CA       1040292 A    10/1978
(Continued)

OTHER PUBLICATIONS

All Office Actions, U.S. Appl. No. 16/807,221.
(Continued)

*Primary Examiner* — Timothy A Brainard
*Assistant Examiner* — Michael W Justice
(74) *Attorney, Agent, or Firm* — Steven Robert Chuey; Sarah M DeCristofaro (57) ABSTRACT

A harmonic radar apparatus includes a transmitter configured to transmit a plurality of fundamental frequencies towards a scene. A further aspect of the harmonic radar apparatus includes a receiver configured to receive a reflected signal from the scene, the reflected signal being modulated based on the scene, and a re-radiated signal from a tag, the re-radiated signal being at a harmonic frequency of at least one of the plurality of fundamental frequencies transmitted by the transmitter.

8 Claims, 7 Drawing Sheets

(51) Int. Cl.
*G06K 19/077* (2006.01)
*G06N 3/08* (2006.01)
*G06N 5/04* (2006.01)
*G06Q 10/08* (2012.01)
*G01S 13/58* (2006.01)
*G01S 13/75* (2006.01)
*G01S 13/87* (2006.01)

(52) U.S. Cl.
CPC .......... *G01S 13/872* (2013.01); *G06K 9/6269* (2013.01); *G06K 19/07758* (2013.01); *G06N 3/08* (2013.01); *G06N 5/04* (2013.01); *G06Q 10/087* (2013.01)

(58) Field of Classification Search
CPC .. G01S 13/753; G01S 13/872; G01S 13/9023; G01S 13/4454
USPC ................................ 342/43, 42, 51, 52, 156
See application file for complete search history.

(56) References Cited

U.S. PATENT DOCUMENTS

| | | | |
|---|---|---|---|
| 4,063,229 A | 12/1977 | Welsh | |
| 4,356,477 A | 10/1982 | Vandebult | |
| 4,471,344 A * | 9/1984 | Williams | G08B 13/2448 |
| | | | 340/572.2 |
| 4,700,179 A * | 10/1987 | Fancher | G08B 13/24 |
| | | | 340/572.2 |
| 5,305,008 A | 4/1994 | Turner | |
| 5,450,492 A | 9/1995 | Hook | |
| 5,559,518 A * | 9/1996 | DiDomizio | G01S 7/2813 |
| | | | 342/174 |
| 6,107,910 A | 8/2000 | Nysen | |
| 6,114,984 A * | 9/2000 | McNiff | G01S 13/9023 |
| | | | 342/146 |
| 6,232,878 B1 | 5/2001 | Rubin | |
| 6,724,310 B1 | 4/2004 | Gershenfeld | |
| 6,788,199 B2 * | 9/2004 | Crabtree | G08B 21/0227 |
| | | | 340/568.1 |
| 6,982,646 B2 | 1/2006 | Rodgers | |
| 7,199,717 B2 | 4/2007 | Lian | |
| 7,639,136 B1 | 12/2009 | Wass et al. | |
| 7,924,161 B1 * | 4/2011 | Spindel | G06K 7/0008 |
| | | | 340/573.1 |
| 8,299,924 B2 | 10/2012 | Holly | |
| 9,395,434 B2 * | 7/2016 | Mazzaro | G01S 7/02 |
| 9,489,813 B1 * | 11/2016 | Beigel | G01S 5/00 |
| 10,497,239 B2 * | 12/2019 | Jeon | G08B 21/0275 |
| 10,636,267 B2 * | 4/2020 | Jeon | G08B 21/0275 |
| 2003/0034887 A1 * | 2/2003 | Crabtree | G01S 3/54 |
| | | | 340/568.1 |
| 2006/0128503 A1 | 6/2006 | Savarese et al. | |
| 2008/0180248 A1 | 7/2008 | Lian | |
| 2010/0109938 A1 | 5/2010 | Oswald et al. | |
| 2010/0188211 A1 * | 7/2010 | Brommer | G06K 19/0675 |
| | | | 340/539.32 |
| 2011/0169657 A1 | 7/2011 | August | |
| 2012/0022348 A1 * | 1/2012 | Droitcour | G01S 13/825 |
| | | | 600/407 |
| 2012/0050016 A1 | 3/2012 | Bieber et al. | |
| 2014/0062699 A1 * | 3/2014 | Heine | G06K 7/10009 |
| | | | 340/572.1 |
| 2014/0266630 A1 | 9/2014 | Beckman | |
| 2014/0313071 A1 * | 10/2014 | McCorkle | G01S 13/106 |
| | | | 342/202 |
| 2015/0084811 A1 * | 3/2015 | Mazzaro | G01V 3/12 |
| | | | 342/175 |
| 2016/0275767 A1 | 9/2016 | Dell | |
| 2018/0300671 A1 | 10/2018 | Richardson et al. | |
| 2018/0350218 A1 * | 12/2018 | Jeon | G06K 7/10475 |
| 2019/0259378 A1 | 8/2019 | Khadloya et al. | |
| 2020/0082692 A1 * | 3/2020 | Jeon | G08B 13/2402 |
| 2020/0285926 A1 | 9/2020 | Bush et al. | |

FOREIGN PATENT DOCUMENTS

| | | |
|---|---|---|
| CA | 1219932 A | 3/1987 |
| DE | 102008056928 A1 | 12/2009 |
| EP | 0341254 B1 | 4/1991 |
| EP | 0434817 B1 | 6/1995 |
| EP | 1594100 A2 | 11/2005 |
| EP | 1285417 B1 | 11/2010 |
| EP | 1899931 B1 | 8/2016 |
| EP | 2606478 B1 | 10/2017 |
| GB | 2306080 A | 4/1997 |
| WO | WO9414143 A1 | 6/1994 |
| WO | WO9416421 A1 | 7/1994 |
| WO | WO9505647 A1 | 2/1995 |
| WO | WO9933017 A1 | 7/1999 |
| WO | WO0186967 A2 | 11/2001 |
| WO | WO0175785 A3 | 3/2002 |
| WO | WO2007081348 A2 | 7/2007 |

OTHER PUBLICATIONS

Lovei et al., "Harmonic Radar—A Method Using Inexpensive Tags to Study Invertebrate Movement on Land", New Zealand Journal of Ecology, vol. 21, No. 2, 1997 pp. 187-193.
Changzhi Li et al: "A Review on Recent Advances in Doppler Radar Sensors for Noncontact Healthcare Monitoring", AIEEE Transactions on Microwave Theory Andtechniques, Plenum, USA, vol. 61, No. 5, May 1, 2013, pp. 2046-2060.
Gao Xiaomeng et al: "Small-scale Displacement Measurement with Passive Harmonic RF tag using Doppler Radar", IEEE International Wireless Symposium( IWS), Apr. 2013, pp. 1-4.
International Search Report and Written Opinion; Application Ser. No. PCT/US2020/020749; dated Jun. 25, 2020; 15 pages.
Wang et al. "Concurrent Vital Sign and Position Sensing of Multiple Individuals Using Self-Injection-Locked Tags and Injection-Locked IIQ Receivers With Arctangent Demodulation", IEEE Transactions on Microwave Theory Andtechniques, Plenum, USA, vol. 61, No. 12, Dec. 2013, pp. 4689-4699.
Zhang Jun et al: "Range-Doppler-based Centralised Framework for Human Target Tracking in Multistatic Radar", IET Radar Sonar Navigation, The Institution of Engineering and Technology,UK, vol. 11, No. 1, Jan. 1, 2017, pp. 193-203.

* cited by examiner

WIRELESS MONITORING SYSTEM

CROSS REFERENCE TO RELATED APPLICATIONS

This application claims the benefit of U.S. Provisional Application No. 62/903,005 filed Sep. 20, 2019, and U.S. Provisional Application No. 62/814,067 filed Mar. 5, 2019, the substance of which are incorporated herein by reference.

FIELD

The present disclosure relates to wireless detection and monitoring and more particularly to monitoring and differentiating individual interaction with products.

BACKGROUND

Understanding how individuals interact with consumer products is important for the development of product improvements, the creation of future products, ensuring consumer safety, etc. Continuously monitoring these interactions is challenging, however, particularly when sensors such as video monitors are impractical or unwanted. Alternative approaches to continuously monitor individual product interactions are desirable.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with the present invention, a harmonic radar apparatus includes a transmitter configured to transmit a plurality of fundamental frequencies towards a scene. A further aspect of the harmonic radar apparatus includes a receiver configured to receive a reflected signal from the scene, the reflected signal being modulated based on the scene, and a re-radiated signal from a tag, the re-radiated signal being at a harmonic frequency of at least one of the plurality of fundamental frequencies transmitted by the transmitter.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

A multi-tone harmonic radar can track individuals as well as tagged products and distinguish between an individual and tagged product to monitor individual-product interactions. In an exemplary implementation, two methods are used: (1) micro-Doppler radar for tracking individuals and (2) harmonic tagging for tracking products. Implementing two tracking methods assists the multi-tone harmonic radar in differentiating the individual and the product as well as distinguish how the individual and the product are interacting.

By combining techniques of radar measurement of moving individuals with wireless radio-frequency identification (RFID) technologies to monitor products, the multi-tone harmonic radar independently measures the movements of individuals and products with which individuals are interacting. By differentiating the motions of individuals and products, the nature of the interactions can be determined, leading to a robust and reliable method for analyzing numerous aspects, including length of interactions, range of motions, specific types of motions, etc. The multi-tone harmonic radar is furthermore capable of extending independent product monitoring to a theoretically unlimited number of individual items using RFID technologies.

As described above, the multi-tone harmonic radar is a wireless system combining two unique technologies to enable differentiable measurement of individual product interactions. Micro-Doppler radar measures moving individuals, and passive harmonic RFID tags measure product movement. Using a low-power transmitted signal, micro-Doppler radar detects and tracks the minute motions of the human body by measuring the small frequency shifts induced in the reflected signals from the various moving parts of the human body. By processing the returned reflected signals in the time-frequency domain, motions due to the movement of arms, legs, body, etc. can be measured over time.

Using the reflected signals, classification algorithms can differentiate activities of an individual as well as which body parts are in motion. Combined with the micro-Doppler measurements identifying individual movements, the multi-tone harmonic radar also receives signals from harmonic RFID tags adhered to the products. The monitored products may consumer products, for example, a razor, a phone, a toothbrush, etc. Harmonic RFID tags collect an incident signal (in this case the transmitted signal from the multi-tone harmonic radar) and retransmit a signal at a harmonic of the incident signal. For example, if the multi-tone harmonic radar transmits a signal operating at 2 GHz, a harmonic RFID tag will generate a 4 GHz retransmitted signal from the harmonic RFID tag. The received 4 GHz signal will be modulated in frequency by movement of the product, which can then be measured. Because this frequency is significantly separated from the 2 GHz scattered signal processed by the micro-Doppler radar receiver within the multi-tone harmonic radar, the motion of the product can be easily differentiated by the receiver.

Figure 1:
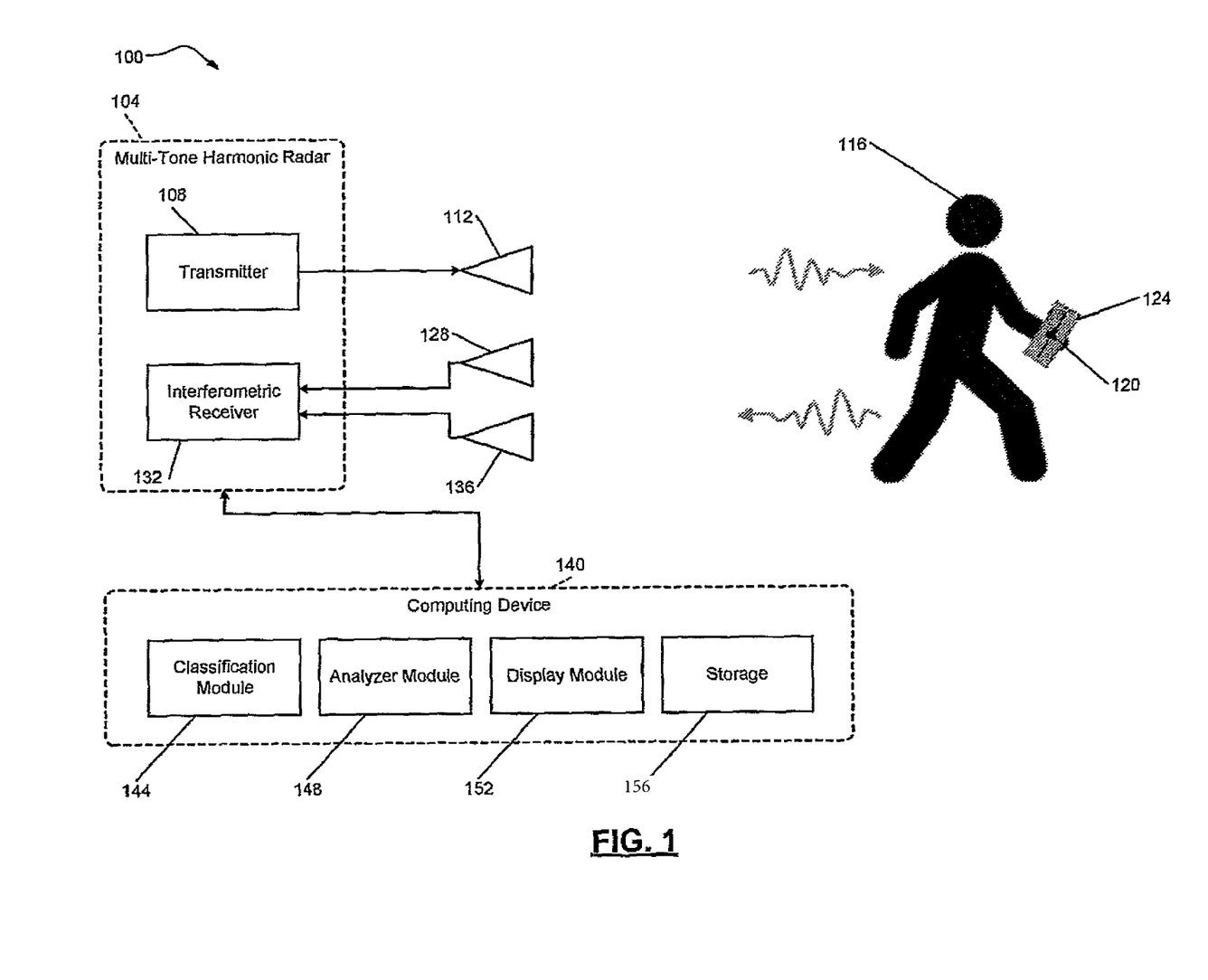
FIG. 1 is a diagrammatic view showing an exemplary design of a wireless tracking system.

Referring to FIG. 1, an overview of an individual product motion measurement system 100 is shown and implemented using a multi-tone harmonic radar 104. The individual product motion measurement system 100 is based on three main concepts used in combination providing a unique method for continuous tracking of individual product interactions. These concepts are: (1) micro-Doppler radar detection of individual motion; (2) harmonic tagging of products for product differentiation; and (3) interferometric radar for continuous three-dimensional motion tracking.

Figure 2A:
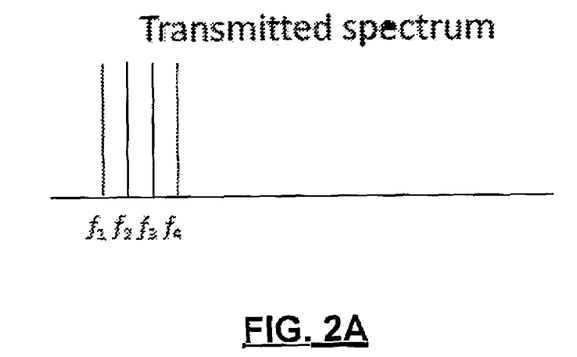
FIG. 2A is a graphical depiction showing an exemplary embodiment of a spectrum transmitted by a multi-tone harmonic radar.
Figure 3A:
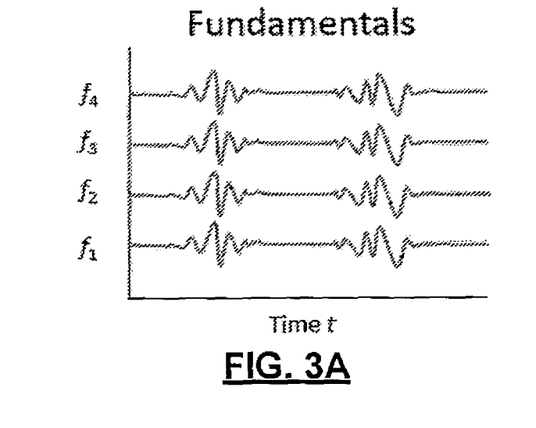
FIG. 3A is a graphical depiction showing an exemplary embodiment of a micro-Doppler response received by a multi-tone harmonic radar in response to individual motion being present.

The multi-tone harmonic radar 104 includes a transmitter 108 configured to transmit a set of fundamental frequencies, shown in FIG. 2A via a transmit antenna 112. Each of the transmitted set of fundamental frequencies is modulated by a micro-Doppler signature of an individual 116 being monitored, as shown by a time-frequency plot of FIG. 3A. For example, while the individual 116 is moving, the micro-Doppler signature of the individual 116 will cause the transmitted signal to expand or compress, the expansion or compression is represented in the reflected signal, sent back to the multi-tone harmonic radar 104. The movements of various parts of the body of the individual 116 can be detected and measured individually using micro-Doppler signal analysis, enabling object classification and activity classification. It is to be appreciated that the reflected signal may not only be from an individual, but also from an active object in the scene, such as a vehicle, animal, or other moving object.

A harmonic RFID tag 120 may be attached, such as by adhering, to a product 124. The harmonic RFID tag 120 may be configured to re-radiate a signal transmitted by the transmitter 108 at a particular harmonic of the fundamental frequency of the transmitted signal. The particular harmonic that the harmonic RFID tag 120 is configured to re-radiate indicates a type of product, providing differentiation between types of products. In various implementations, a similar approach may be used to identify a particular product, for example, by serial number or other identifying information. Harmonic RFID tags re-radiate incident wireless signals at a harmonic of the incident frequency, enabling easy discrimination of the motion of individuals and products. Traditional radars are only able to measure motion in the radial direction (towards or away from the radar), a new type of radar, interferometric radar, for continuous, 3D motion tracking can measure both radial and angular velocity, enabling full 3D motion tracking In various implementations, the multi-tone harmonic radar 104 will be a software-defined radio (SDR) for signal generation and reception, combined with microwave hardware including amplifiers, filters, and antennas. The multi-tone harmonic radar 104 transmits a continuous-wave signal at a fundamental frequency $f_0$ that reflects off the individual 116 and the product 124. The reflections from the various parts of the individual's body are strong enough to easily measure the micro-Doppler signature; however, the reflection from the product at $f_0$ will generally be too weak to detect. A harmonic RFID tag placed on the product will re-radiate a signal at $2f_0$, which can easily be detected since the re-radiated signal will be the only signal at that frequency.

Figure 2B:
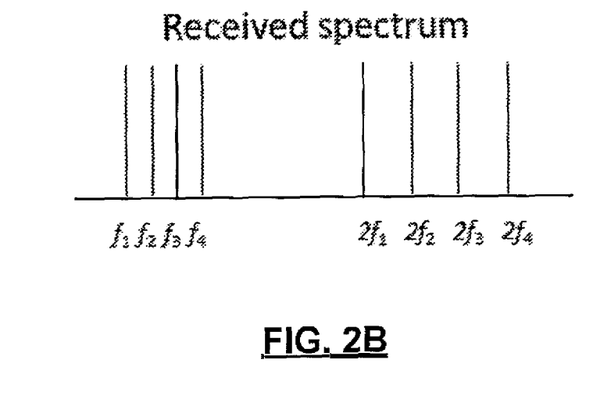
FIG. 2B is a graphical depiction showing an exemplary embodiment of a spectrum received by a multi-tone harmonic radar.
Figure 3B:
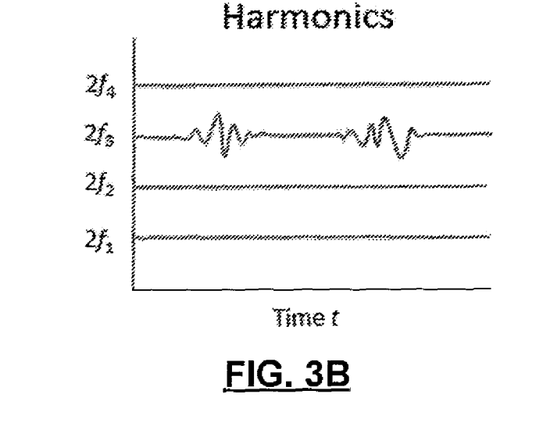
FIG. 3B is a graphical depiction showing an exemplary embodiment of a time-varying frequency shift of a product in motion received by a multi-tone harmonic radar.

The re-radiated signal from the harmonic RFID tag 120 at the particular harmonic is collected by a harmonic radar antenna 128. Only those harmonic RFID tags that are moving with the individual will generate time-varying frequency shifts, shown in FIG. 3B, enabling direct detection of individual product interactions. An interferometric receiver 132 is configured to receive the re-radiated signal from the harmonic RFID tag 120 using the harmonic radar antenna 128 and the reflected signal from the individual 116 using a Doppler antenna 136, enabling 3D motion tracking. In various implementations, the interferometric receiver 132 may include a harmonic radar detection device configured to receive and analyze the re-radiated signal from the harmonic RFID tag 120. Additionally, the interferometric receiver 132 may include a Doppler radar detection device configured to receive and analyze the reflected signal from the individual 116. FIG. 2B graphically depicts the received reflected signal from the individual 116 as $f_1$, $f_2$, $f_3$, $f_4$ and the received re-radiated signal from the harmonic RFID tag 120 as $2f_1$, $2f_2$, $2f_3$, $2f_4$.

In an exemplary aspect, the multi-tone harmonic radar 104 communicates with a computing device 140, for example, via a WiFi connection or a near field communications protocol, such as Bluetooth Low Energy. The computing device 140 includes a processor and user interface (not shown). The processor may be configured to analyze data received from the multi-tone harmonic radar 104. For example, the computing device 140 may receive the received signals from the interferometric receiver 132 and conduct analyses on the received signals. For example, the computing device 140 can determine a velocity or a position of the product 124 during each interaction with the individual 116, indicating how the individual 116 is using the product 124. The amount of product use, length of product use, and time of day the product is used may also be monitored.

In various implementations, the computing device 140 may include a classification module 144, an analyzer module 148, and a display module 152. The classification module 144 is configured to distinguish the received signals as the individual 116 moving and/or the product 124 being moved with the individual 116. The classification module 144 may further classify individual movements according to which body parts of the individual are moving. Similarly, the classification module 144 may distinguish between a type of product based on the harmonic of the re-radiated signal.

The analyzer module 148 is configured to analyze the received signals and compare the received signals to kinematic models. The comparison to kinematic models can assist the computing device 140 in determining the type of interaction being monitored by the multi-tone harmonic radar 104. For example, kinematic models may be generated and uploaded to a central database for comparison to monitored interactions. The computing device 140 may also include a storage 156 configured to store received signals for future analysis and processing. The computing device 140 may be configured to identify where the product 124 is located, how the individual 116 is holding the product 124

(if the individual 116 is holding the product 124), how often the product 124, is being used by the individual 116, and additional individual interactions with products.

Being better able to monitor how individuals interact with particular products provides insight with how able-bodied individuals interact with products as well as particular individuals, such as the elderly, handicapped, etc. For example, the multi-tone harmonic radar 104 may inform how an individual is interacting with a particular product when the individual has a limited range of motion, such as if the individual has difficulty lifting their arms or if the individual is wheelchair bound, their particular interactions with certain products may inform of options for product improvement. In various implementations, the multi-tone harmonic radar 104 may be incorporated into electronics commonly existing in living spaces, incorporated into the infrastructure of a living space, or as a separate device. Additionally, the multi-tone harmonic radar 104 may monitor a plurality of products, each product having a unique identifier (as described above) to re-radiate the transmitted signal at a different harmonic to differentiate the products.

In various implementations, the storage 156 may be accessed by a machine learning system configured to generate kinematic models of identified individuals. Once an individual has been monitored for an amount of time, the machine learning system is able to generate a kinematic model corresponding to that individual. In this way, the machine learning system may distinguish between different individuals in a living space.

A multi-tone micro-Doppler is a continuous-wave radar that is configured to transmit a set of tones separated in frequency by a bandwidth greater than the expected individual micro-Doppler signature, enabling up to tens of frequencies while still easily detecting the micro-Doppler signature. In various implementations, a pulse wave form may alternatively or additionally be used to also gather range data to determine a location or distance of a moving object from the radar.

Harmonic RFID tags may be matched to each tone. The spectrum captured by the harmonic radar then consists of many copies of the individual micro-Doppler signature (any of which can easily be processed for individual motion measurement) and the spectra of any present products at their specific harmonic frequencies. In this manner, the motion of a number of separate products can be tracked by observing the changes in frequency of the individual harmonic signatures. In various implementations, dipole-based harmonic tags may be used as harmonic RFID tags due to their simplicity. Additionally, electrically small, narrow-band antennas may be used to enable greater spectral density of the harmonic RFID tags, resulting in tracking of more individual products.

Implementing scalability to many thousands of products will require unique signatures on each harmonic RFID tag. Additional hardware on each harmonic RFID tag can implement unique ID signatures; however, embedded RFID signatures necessitates the capture and storage of more energy than simple harmonic tags.

Micro-Doppler frequencies are produced whenever a radar system is viewing an object with micro-motions in the radial direction. An individual walking towards a radar generates micro-Doppler through the backscattered radar signals from the torso, arms, and legs. The torso gives rise to the bulk Doppler frequency, while the periodic arm swing and leg swing gives rise to the micro-Doppler frequencies around the bulk Doppler frequency. The information contained in the micro-Doppler frequencies can therefore be used to discriminate between objects, and to classify the activities of individuals based on their velocity profiles. For example, the classification module 144 may discriminate between varying velocities to identify activities of an individual or motion of different body parts of the individual.

For example, a micro-Doppler signature of a walking individual exhibits a large oscillatory signal due to the movement of the legs, while the oscillatory signatures with less frequency spread are due to the movement of the arms. In a micro-Doppler signature, the vehicle produces a strong bulk frequency shift while the individual produces oscillating frequency sidebands. These types of signature features are used to classify individuals and vehicles, and notably, a long duration signal is not necessary for classification. The classification module 144 may be implemented using classification algorithms that discriminate between vehicles and individuals using micro-Doppler features in short time frames.

Figure 4:
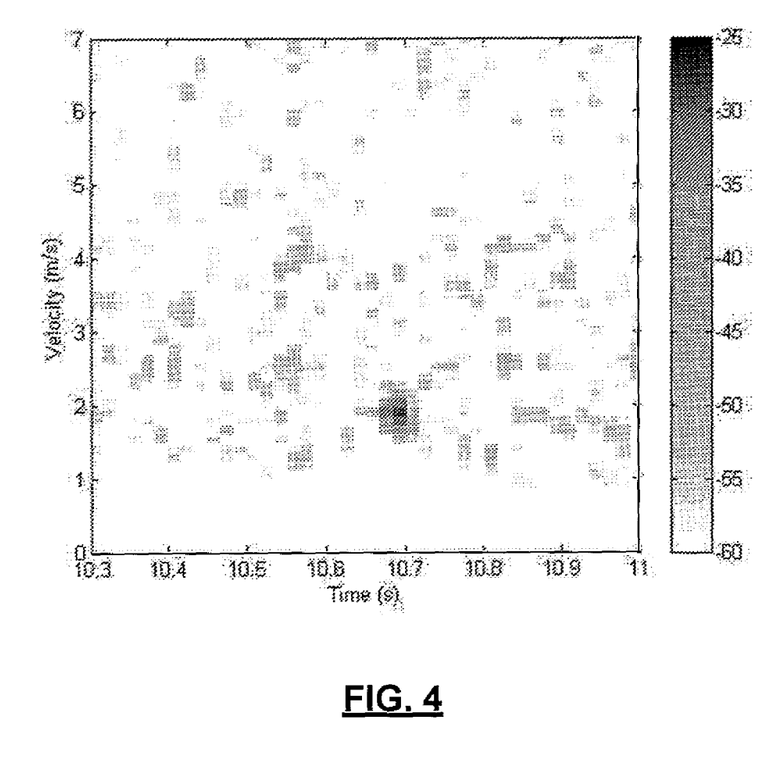
FIG. 4 is a graphical depiction showing an exemplary embodiment of a single-look of Doppler signatures of a moving vehicle.
Figure 5:
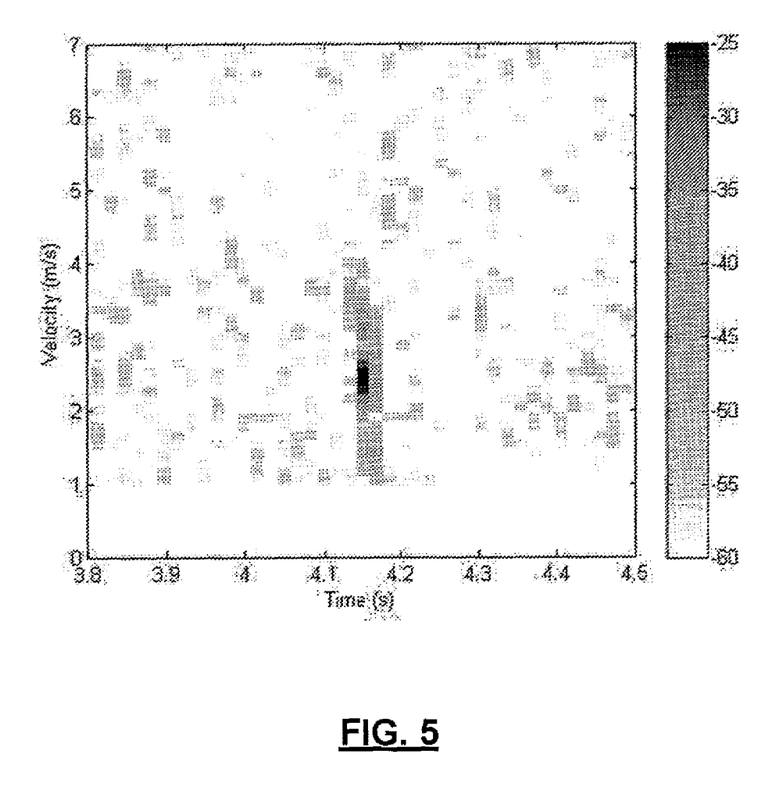
FIG. 5 is a graphical depiction showing an exemplary embodiment of a single-look of Doppler signatures of a jogging person.

FIGS. 4 and 5 show the reflected signal from a vehicle (FIG. 4) and an individual (FIG. 5) with a rotating 30 GHz Doppler radar. The additional reflected signals from the individual are clearly depicted. The classification algorithm operates on whether the reflected signal contained a single scatterer or multiple scatterers. Even with only this single feature, a classifier (such as the classification module 144) may achieve >90% probability of detection with only ten radar data points. While the proposed multi-tone harmonic radar system will operate at a lower frequency, the Doppler resolution is dependent on the integration time of the processing (that is, the length of the observation), thus the ability to detect and classify individual motion is independent on the actual carrier frequency; many prior works have demonstrated micro-Doppler classification of activities of an individual at frequencies of 3 GHz or lower.

Unlike traditional radar sensors, which transmit and receive at the same frequency, detection of harmonic RFID tags utilizes a nonlinear device which retransmits or re-radiates a signal at a harmonic of the incident frequency. A simple tag can consist of a dipole antenna which is ½ wavelength long at the incident frequency and is 1 wavelength long at the first harmonic frequency, ensuring high radiation efficiency in both bands. For example, a diode located at the feed point of the dipole provides sufficient harmonic capabilities. In various implementations, Schottky barrier diodes (SBD) were used as the nonlinear device for tags affixed to insects for the purposes of tracking. Such tags can be small and lightweight, weighing 10 mg or less.

The multi-tone harmonic radar 104 transmitting using the transmitter 108 at a fundamental frequency receives the signal scattered off the object of interest in the presence of scattered signals from the background and any other objects in the scene. For a motion detection radar, clutter responses are not a problem except for objects moving with very low speed, where the Doppler shift is close to or within the Doppler spread of the clutter. For a radar operating in the 2-4 GHz band, movements of individuals are generally fast enough to easily discern the Doppler shift from the response of the background clutter. However, the movement of small objects or slow-moving objects can be challenging to detect.

The benefit of using harmonic tags for motion tracking is that the scattered harmonic signal has a better signal-to-clutter ratio than the signals scattered at the fundamental frequency, since the only signal present at the harmonic frequency is due to the harmonic RFID tag. With this method, small and slow-moving objects can be detected, such as insects.

While the radar can easily detect and monitor the movement of the individual 116, differentiating the movement of a product in the same frequency band is extremely challenging. As shown in FIG. 1, by placing harmonic tags on the products, the individual product motion measurement system 100 will detect the movement of the product 124 in a separate frequency band from that of the moving individual 116.

In various implementations, as described above, the harmonic RFID tag 120 may instead be a dipole-based tag. Dipole-based harmonic tags are simple and easy to fabricate as well as tune to the specific frequencies of the multi-tone harmonic radar 104. The drawback with dipole antennas is that the bandwidth is wide, limiting the number of products that can be simultaneously tracked. An electrically small antenna which not only has inherently narrow bandwidth, enabling greater scalability in frequency, but is also more compact may be used as a harmonic RFID tag as well.

The transmitter 108 transmits a multi-tone radar signal with N tones spaced evenly in frequency by $\delta f$ and can be represented in general by Equation 1:

$$s_{tx}(t) = \sum_{n=0}^{N-1} a_n e^{-j2\pi t(f_0 + n\delta f)}$$

where $f_0$ is the lowest frequency and $a_n$ are the amplitudes of the tones. The received signal is composed of two summations, a first is the result of the scattering of the transmitted fundamental frequencies [$f_0$, $f_0+\delta f$, . . . $Nf_0+\delta f$] off the individual, and a second the result of the harmonics generated by the harmonic RFID tags.

The received signal received by the interferometric receiver 132 is given in general by Equations 2 and 3:

$$s_{rx}(t) = s_{rx1}(t) + s_{rx2}(t)$$

where $$s_{rx1}(t) = \sum_{n=0}^{N-1} \sum_{m=1}^{M} b_n b_m e^{-j2\pi t(f_0 + n\delta f)\left(1+\frac{2v_m}{c}\right)}$$

is the signal scattered off the individual with M scattering centers of velocity $v_m$ (e.g. torso, arms, legs); the amplitude terms $b_n$ are due to propagation while $b_m$ account for differences in reflectivity of the separate body parts, and any differential multipath. The signal received from the N harmonic RFID tags is then given by Equation 4:

$$s_{rx2}(t) = \sum_{n=0}^{N-1} d_n e^{-j2\pi t h_n(f_0 + n\delta f)\left(1+\frac{2v_n}{c}\right)}$$

where $d_n$ accounts for propagation and effective scattering cross-section of the tags, $h_n$ represents the harmonic that the nth tag is tuned to (for example, the second harmonic may be used for all harmonic RFID tags, thus $h_n=h=2$), and $v_n$ is the radial velocity of the nth tag.

Signal generation and reception may be implemented in SDR. The principal limitations on frequency separations will be the maximum expected micro-Doppler shift from the individual and the bandwidth of the dipole. At a carrier frequency of 3 GHz, the bandwidth of an individual micro-Doppler response will generally be less than 1 kHz, thus the tone separation can be quite small. The limitation will then be on the bandwidth of the harmonic RFID tag antenna, which must be small enough that adjacent tag channels do not overlap. This bandwidth depends on the design of the antenna.

Figure 6A:
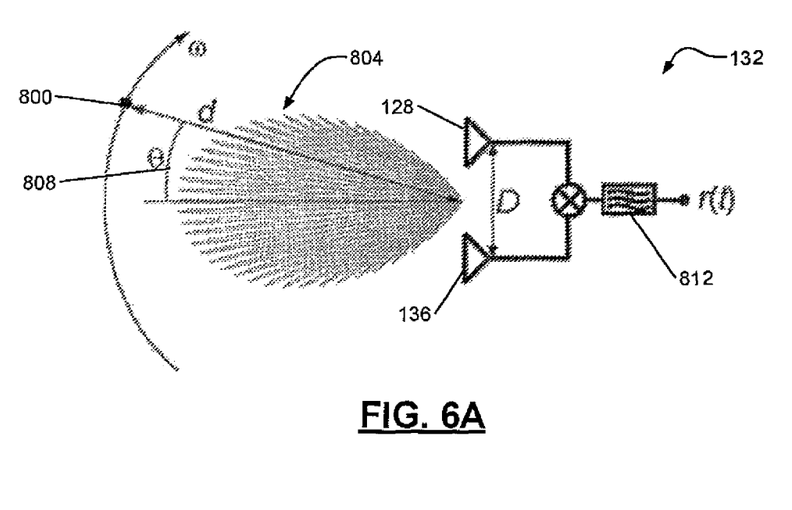
FIG. 6A is a diagrammatic view showing an exemplary design of an interferometric radar receiver viewing an object passing through an interference pattern.

Referring now to FIG. 6A, a diagrammatic view showing an exemplary design of the interferometric receiver 132 viewing an object 800 passing through an interference pattern 804 is shown. Instantaneous radar measurement of the object's angle rate 808 is accomplished by measuring the changing phase of the radar output signal as the object progresses through the radiation pattern of the receiving antenna system. For typical radar receivers, the receiving aperture comprises a wide element pattern and the array pattern, generally resulting in a single mainbeam and associated sidelobes, which cannot provide a useful measurement of the angular rate of change.

Figure 6B:
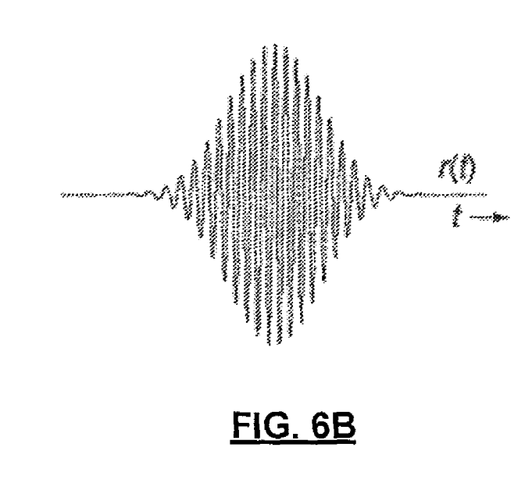
FIG. 6B is a graphical depiction showing a signal response of the object from FIG. 6A.

By implementing the interferometric receiver 132 composed of two elements widely separated (D) and correlating the signals received by each antenna (for example, 128 and 136), the object 800 passing through the resulting interference pattern 804 generates an oscillatory signal response, shown in FIG. 6B. A correlator 812 can be implemented in analog hardware or in processing by first digitizing the received signals. Near broadside to the array (corresponding to a field of view of about 60°), the frequency of the signal response is directly proportional to the angular velocity $\omega$ of the object 800 and the antenna separation D, divided by the wavelength $\lambda$, shown in Equation 5:

$$f_s = \frac{\omega D}{\lambda}$$

Compared to the Doppler frequency, $$f_D = \frac{2v}{\lambda},$$

where v is the radial velocity of the object, the interferometric frequency response is in a mathematically identical form. The difference is that, with the interferometric measurement, the frequency response is designed based not only on the wavelength of the transmitted signal, but also on the separation (D) of the antenna elements 128 and 136, enabling two degrees of freedom with which the response can be designed. Because the receiver implements a correlation process, the response is generally independent of the transmit waveform. This process works even when sensing only passive thermally-generated radiation from individuals. Therefore, the interferometric measurement can potentially be added to existing radar systems with the addition of a second antenna and receiver.

A primary benefit of the interferometric measurement technique is the ability to measure motion where the Doppler sensors cannot. When the radial motion is minimal or zero, the Doppler sensor cannot discern the motion of the object; however, the interferometric sensor measures the highest frequency shift when the motion is strictly angular (zero radial velocity). Thus, the interferometric sensor and the Doppler sensor provide complementary measurements. The complementary nature can be seen in terms of the total velocity vector of the moving point object, given by $v=rv_r+$ φv$_t$, where v$_r$ is the radial velocity and v$_t$ is the tangential linear velocity. The Doppler frequency shift is then given by Equation 6:

$$f_D = \frac{2v}{\lambda}\cos\phi$$

where φ is the angle between the object trajectory vector and the radial vector towards the sensor. The angular velocity can be given in terms of the tangential linear velocity by $$\omega = \frac{v_t}{R}.$$

In terms of the total velocity, the frequency shift from the interferometric measurement is given by Equation 7:

$$f_s = \frac{vD}{\lambda R}\sin\phi$$

Equations 6 and 7 show that the two measurements are complementary in terms of the direction of the object relative to the sensor. Thus, by combining both the interferometric measurement and the Doppler measurements, the angle of a moving object can be measured regardless of the direction of motion.

Figure 7:
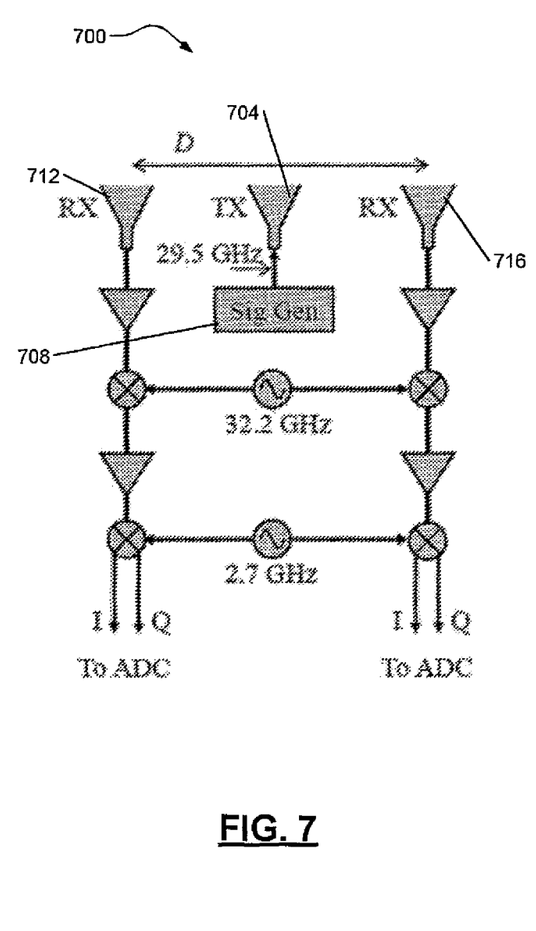
FIG. 7 is a diagrammatic view showing an exemplary design of a radar block diagram.

FIG. 7 is a diagrammatic view showing an exemplary design of a radar block diagram 700. A transmit antenna 704 transmits a signal produced by a signal generator 708. Two receiver antennas 712 and 716, spaced apart D, are configured to receive a reflected signal from an object and a re-radiated signal from a product, as discussed with respect to FIGS. 1 and 6A, above.

Figure 8A:
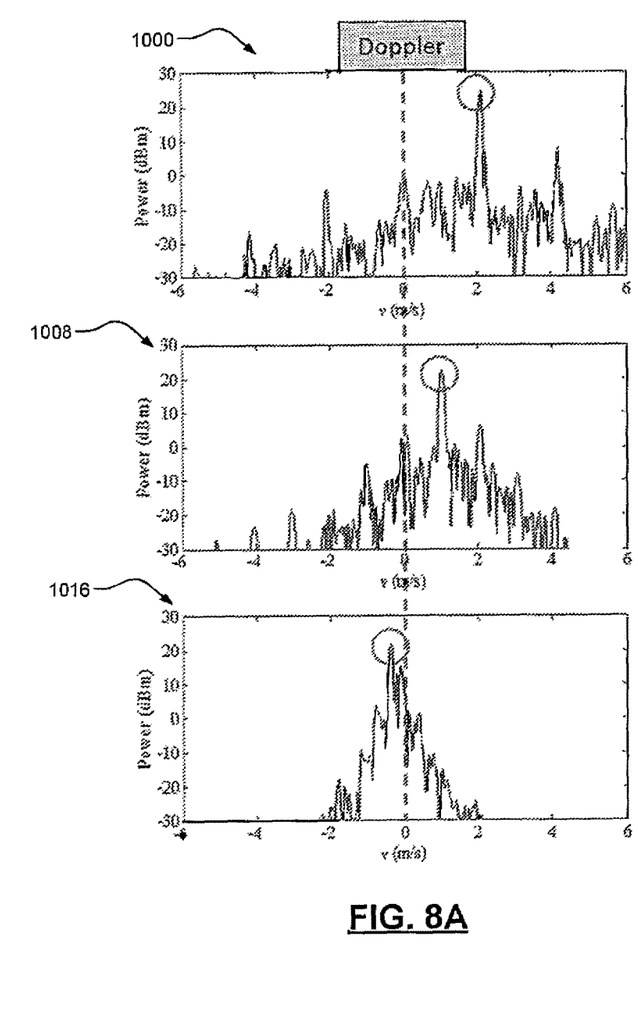
FIGS. 8A-8B are graphical depictions showing measured Doppler responses of a person walking in three different trajectories and interferometric radar responses of a metal reflector being held by the person while walking.
Figure 8B:
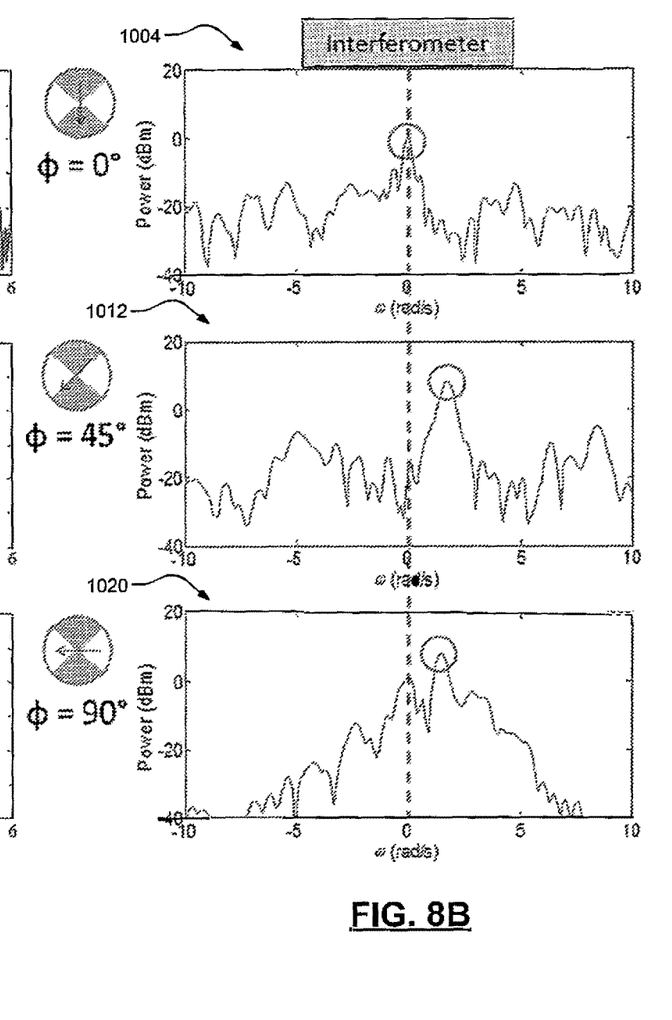

Referring now to FIGS. 8A and 8B, Doppler and interferometric radar response measurements, respectively, are shown. Specifically, FIG. 8A shows the measured Doppler response and FIG. 8B shows the measured interferometric radar response of an individual holding a metal reflector (for example, a product) and walking in three different trajectories: towards the radar 1000 and 1004, at a 45° angle 1008 and 1012, and angularly 1016 and 1020. The radar operated at 30 GHz, and the interferometric receiver had an antenna separation of 90λ. The measurements clearly indicate the complementary nature of the frequency shift: the Doppler mode detects radial movement (φ=0°), the interferometer mode detects angular movement (φ=90°), and both detect movement in between (φ=45°). By implementing two interferometers in orthogonal directions, full 3D motion can be measured.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

While various embodiments have been disclosed, it should be appreciated that additional variations of the wireless monitoring system and method are also envisioned. For example, additional or different hardware components may be used although certain of the present advantages may not be fully realized. It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and spirit of the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring interaction of an individual and a product, the method comprising:
   providing a multi-tone radar comprising a transmitter and a receiver, wherein the transmitter comprises a transmit antenna and the receiver comprises a harmonic radar antenna and a doppler antenna;
   providing a product comprising a harmonic tags;
   transmitting a signal using the transmitter, wherein the signal comprises at least one tone at an incident frequency;
   receiving a reflected signal based on the signal interacting with an individual, wherein the reflected signal is received by the receiver;
   measuring one or more movements of the individual using micro-Doppler information contained in the reflected signal;
   receiving a re-radiated signal based on the signal interacting with the harmonic tag, wherein the re-radiated signal is detected by the harmonic radar antenna, and wherein the re-radiated signal is at a harmonic frequency of the incident frequency; and
   measuring one or more movements of the product using the harmonic frequency and micro-Doppler information contained in the re-radiated signal.

2. The method of claim 1, comprising communicating the reflected signal and the re-radiated signal to a computing device, wherein the computing device comprises a processor, and wherein the processor determines at least one of a velocity and a position of the product.

3. The method of claim 1, wherein the one or more movements of the individual are combined with the one or more movements of the product to determine an activity.

4. The method of claim 2, wherein the computing device comprises at least one of a classification module, an analyzer module, and a display module.

5. The method of claim 4, wherein the classification module is configured to receive the reflected signal and the re-radiated signal and configured to distinguish the one or more movements of the individual based on the reflect signal and the one or more movements of the product based on the re-radiated signal, and wherein the classification module classifies the one or more movement of the individual and the one or more movements of the product.

6. The method of claim 4, wherein the analyzer module is configured to receive the reflected signal and the re-radiated signal and compare each of the reflected signal and the re-radiated signal to a kinematic model, and wherein the analyzer communicates with the classification module.

7. The method of claim 1, wherein the activity comprises at least one of holding the product and using the product.

8. The method of claim 1, wherein the harmonic tag is attached to the product.

* * * * *